United States Patent
Kwom et al.

(10) Patent No.: US 8,671,780 B2
(45) Date of Patent: Mar. 18, 2014

(54) STRAIN GAUGE TYPE FORCE-TORQUE SENSOR AND METHOD FOR MANUFACTURING THE SAME

(75) Inventors: Soon-myung Kwom, Gyeonggi-do (KR); HyunJin Jung, Gyeonggi-do (KR); Hiwon Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 193 days.

(21) Appl. No.: 13/371,686

(22) Filed: Feb. 13, 2012

(65) Prior Publication Data
US 2013/0139615 A1 Jun. 6, 2013

(30) Foreign Application Priority Data
Dec. 2, 2011 (KR) .................... 10-2011-0128212

(51) Int. Cl.
*G01L 1/22* (2006.01)
*G01D 7/00* (2006.01)
*B29C 65/00* (2006.01)

(52) U.S. Cl.
USPC .............. 73/862.045; 73/862.041; 156/196

(58) Field of Classification Search
USPC ............. 73/862.045, 862.041, 781; 156/196
See application file for complete search history.

(56) References Cited

U.S. PATENT DOCUMENTS

| | | | |
|---|---|---|---|
| 4,763,531 A * | 8/1988 | Dietrich et al. | 73/862.044 |
| 4,849,730 A | 7/1989 | Izumi et al. | |
| 5,648,617 A * | 7/1997 | Cullen et al. | 73/862.045 |
| 2010/0000327 A1* | 1/2010 | Morimoto | 73/760 |
| 2011/0314935 A1* | 12/2011 | Krippner et al. | 73/862.045 |

FOREIGN PATENT DOCUMENTS

| | | | | |
|---|---|---|---|---|
| EP | 0381187 A2 | 8/1990 | | |
| JP | 08086696 A * | 4/1996 | | G01L 1/00 |
| KR | 10-2005-0111009 | 11/2005 | | |
| KR | 10-2011-0046628 A | 5/2011 | | |
| KR | 10-2011-0105026 | 9/2011 | | |
| WO | 9411718 A1 | 5/1994 | | |
| WO | WO 2010088922 A1 * | 8/2010 | | G01L 3/14 |
| WO | 2011-045837 A1 | 4/2011 | | |

* cited by examiner

*Primary Examiner* — Lisa Caputo
*Assistant Examiner* — Jamel Williams
(74) *Attorney, Agent, or Firm* — Edwards Wildman Palmer LLP; Peter F. Corless (57) ABSTRACT

Disclosed is a strain gauge type force-torque sensor and a method for manufacturing the same. More specifically, a first sensor structure having a convex part on a bonding surface thereof and a second sensor structure having a concave part bonded to the convex part of the first sensor structure are formed. The gauge film is formed by installing a strain gauge on a flexible film. The gauge film is compressively interposed between the bonding surface of the first sensor structure having the convex part and a bonding surface of the second sensor structure having the concave part to initially deform the gauge film. The first sensor structure and the second sensor structure are fixed to each other in a state where the gauge film is initially deformed.

13 Claims, 6 Drawing Sheets

(PRIOR ART)

US 8,671,780 B2

STRAIN GAUGE TYPE FORCE-TORQUE SENSOR AND METHOD FOR MANUFACTURING THE SAME

CROSS-REFERENCE TO RELATED APPLICATION

This application claims under 35 U.S.C. §119(a) the benefit of Korean Patent Application No. 10-2011-0128212 filed Dec. 2, 2011, the entire contents of which are incorporated herein by reference.

BACKGROUND (a) Technical Field

The present invention relates to a force-torque sensor and a method for manufacturing the force-torque sensor. More particularly, it relates to a strain gauge type force-torque sensor and a method for manufacturing the force-torque sensor, which can measure multi-axial force and torque and save on manufacturing cost, and can overcome difficulties in attaching of a gauge and sensor defects and errors generated while attaching the gauge.

(b) Background Art

Automated facilities using robots have been widely used for various industries including precision welding and assembly processes on automobile assembly lines for years. To operate the robot-based automated facilities, it is necessary to measure and simultaneously feedback-control the location of a robot and the force and torque acting on the distal tools connected to robots. Particularly, to automatize complex and delicate tasks, position control and power control of robot arms and distal tools need to be simultaneously performed.

A position control method is mostly used for robots currently in use. However, as uses and the technology requirements of robots technologically progress to an environment which coexists with humans, service robots are expected to perform various tasks with a single device, and methods for driving these robots are being changed into practical force-controlling methods. Thus, interest in force-torque sensors that are being applied to robotic fields is gradually increasing as well.

A force-torque sensor detects external forces that act on the distal mechanism (e.g., distal tools installed on a robot arm) and plays an important role in the force-control robots, and therefore will be a core component service type robot in the future.

In particular, the measurement methods of typical force-torque sensors detecting external forces acting on robots and distal mechanisms may be roughly divided into methods which use deformation of an elastic body with a strain gauge, methods which use piezoelectric materials, and methods which use a Stewart platform mechanism with Linear Voltage Different Transforms (LVDT).

U.S. Pat. App. Pub. No. 2010/0000327 discloses a strain gauge type force-torque sensor. The sensor includes two flanges, each of which includes a flexible part and a connection part connected to the center thereof. The sensor measures a resistance variation using two or four strain gauges. In this case, strain gauges are located in a straight line on a plane of a lower flange, and the strain gauges are attached in orthogonal directions with respect to each axis. Also, U.S. Pat. App. Pub. No. 2008/0184819 discloses an electrostatic type sensor.

Figure 6:
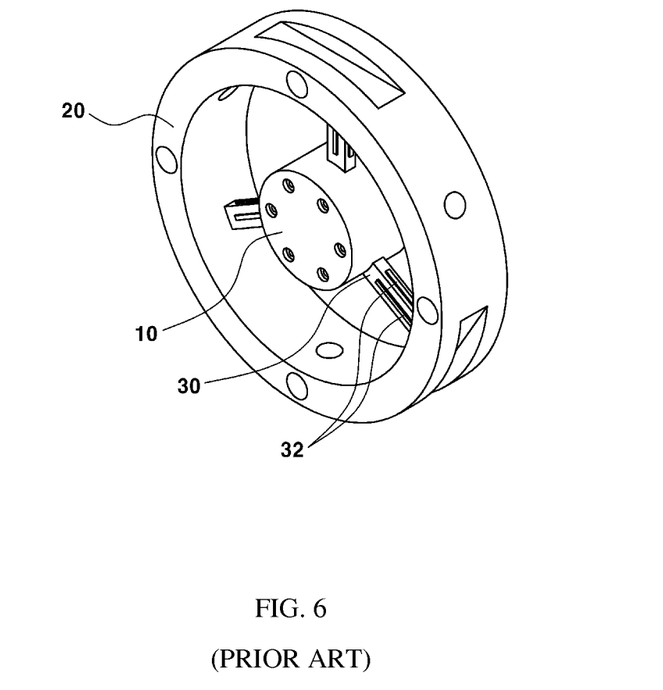
FIG. 6 is a view of a typical six axial force-torque sensor using deformation of an elastic body with a strain gauge.

FIG. 6 is a view of a typical six axial force-torque sensor using deformation of an elastic body with a strain gauge. A tool connection part 10 is connected to a distal mechanism (tool), and a robot connection part 20 is connected to a robot arm or the like.

In the above force-torque sensor, the outer circumferential surface of the tool connection part 10 and the inner circumferential surface of the robot connection part 20 are integrally connected by three elastic beams 30, each of which is mechanically deformed by force or torque. Like a kind of torsion beam, the elastic beams 30 may be elastically distorted by force or torque. In this case, a plurality of strain gauges 32 are attached to the three elastic beams 30 to measure force and torque according to mechanical deformation of the elastic beams 30.

Such a typical six axial force-torque sensor has to be designed by expecting the change of the structure of the elastic beam, and has a structure in which the sensitivity of the sensor is determined according to the performance of the stain gauges attached to the elastic beams. The typical six axial force-torque sensor can measure both magnitude and direction of three-dimensional force components (Fx, Fy and Fz) and three dimensional torque components (Mx, My and Mz) when force and torque are applied. Since the force and torque components of each direction are mutually associated with each other, expensive silicon strain gauges are being used on the elastic beams to improve the accuracy of the measurement.

Although the six axial force-torque sensor mounted on a "wrist" portion of a robot shows sufficient sensitivity for measuring six axial force-torque in a signal structure, its elastic body (elastic beam) has a complicated three-dimensional structure, causing an increase in the manufacturing costs. Accordingly, it is necessary to develop a cost-saving and efficient force-torque sensor for distribution and popularization of robots.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a strain gauge type force-torque sensor and a method for manufacturing the force-torque sensor, which can measure multi-axial force and torque and save on manufacturing cost, and can overcome difficulties in attaching a gauge and sensor defects and errors generated while attaching the gauge.

In one aspect, the present invention provides a method for manufacturing a strain gauge type force-torque sensor. This method includes forming a first sensor structure having a convex part on a bonding surface thereof and a second sensor structure having a concave part bonded to the convex part of the first sensor structure; forming a gauge film by installing a strain gauge on a flexible film; compressively interposing the gauge film between the bonding surface of the first sensor structure having the convex part and a bonding surface of the second sensor structure having the concave part to initially deform the gauge film; and fixing the first sensor structure and the second sensor structure to each other when the gauge film is initially deformed.

In an exemplary embodiment, the first sensor structure and the second sensor structure may include: an outer coupling part disposed along an edge thereof; a central coupling part disposed inside the outer coupling part and spaced from the outer coupling part; and a plurality of connection parts connecting between the outer coupling part and the central coupling part that are spaced from each other. More specifically, the outer coupling part, the central coupling part, and the plurality of connection parts are integrally formed, and the outer coupling part and the central coupling part are formed with a different thickness so that the central coupling parts of each sensor structure embody the convex part and the concave part, respectively.

In some embodiments, the gauge film may have protrusions on both surfaces thereof, and the protrusions may be inserted into the outer coupling part and the central coupling part, respectively. The gauge film may be manufactured by installing strain gauges on a flexible and flat film in multi-axial directions.

In yet another exemplary embodiment, the first sensor structure and the second sensor structure may have a plurality of coupling apertures for coupling with external devices in the outer coupling part and the central coupling part thereof, respectively, and the protrusions of the gauge film may be inserted into the coupling apertures of the outer coupling part and the central coupling part, respectively.

In still yet another exemplary embodiment, the protrusions of the gauge film inserted into the coupling apertures of the outer coupling part may have a different height from the protrusions of the gauge film inserted into the coupling apertures of the central coupling part, and a height difference between the protrusions may be the same as a height difference between the central coupling part and the outer coupling part of each sensor structure.

In another aspect, the present invention provides a strain gauge type force-torque sensor manufactured by a method described above which includes: a first sensor structure having a convex part on a bonding surface thereof; a second sensor structure having a concave part on a bonding surface thereof; and a gauge film manufactured by disposing a strain gauge on a flexible film and compressively interposed between the bonding surface of the first sensor structure and the bonding surface of the second sensor structure to be initially deformed by the convex part of the first sensor structure and the concave part of the second sensor structure.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

100: force-torque sensor
110: first sensor structure
111: outer coupling part
112: central coupling part
113: connection part
114: coupling aperture
120: second sensor structure
121: outer coupling part
122: central coupling part
123: connection part
124: coupling aperture
130: gauge film
131: protrusion
132: strain gauge It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 1:
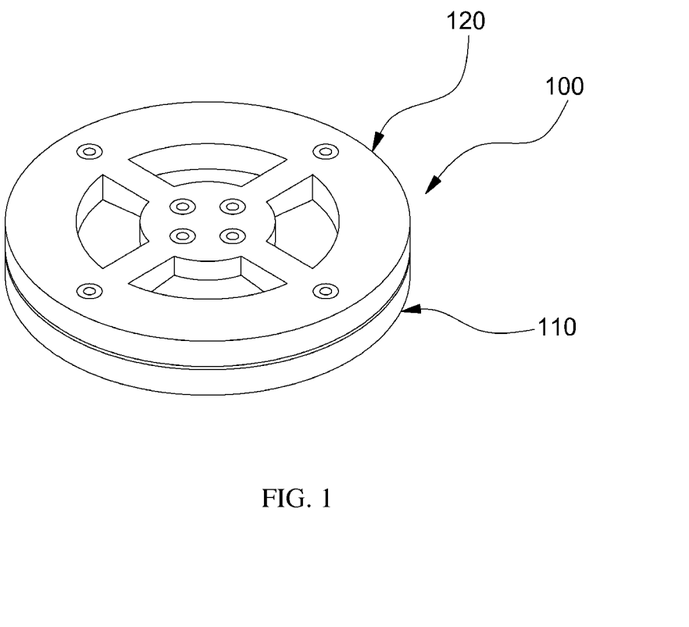
FIG. 1 is a perspective assembled view of a force-torque sensor according to an exemplary embodiment of the present invention.
Figure 2:
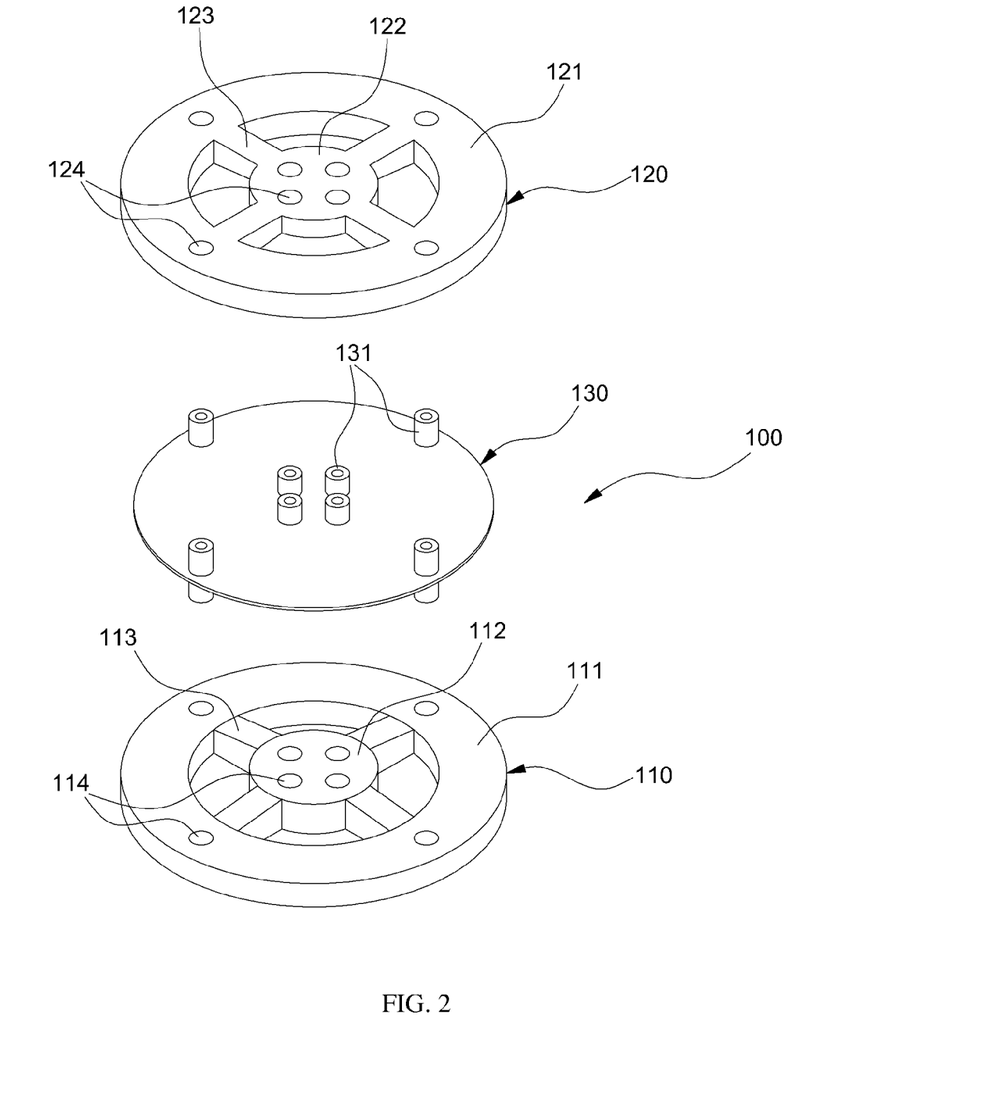
FIG. 2 is a perspective exploded view of a force-torque sensor according to an exemplary embodiment of the present invention.

FIG. 1 is a perspective assembled view of a force-torque sensor according to an embodiment of the present invention, and FIG. 2 is a perspective exploded view of a force-torque sensor according to an embodiment of the present invention. FIG. 2 shows a gauge film 130 before assembling (e.g., initial state prior to initial deformation). A strain gauge installed on the surface of the gauge film 130 is not shown in FIG. 2 (see e.g., FIG. 3).

Figure 3:
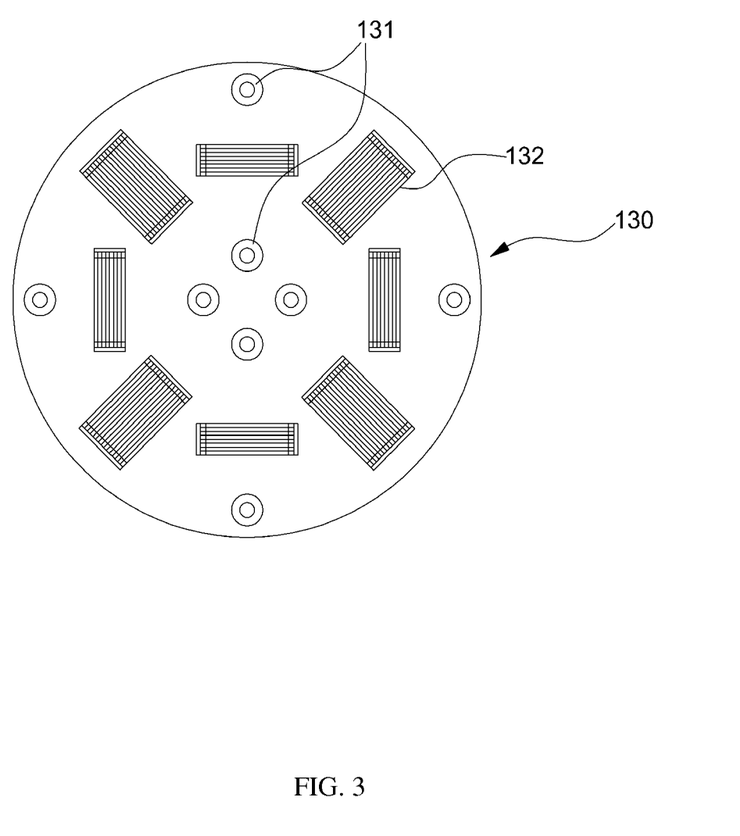
FIG. 3 is a plan view of a gauge film including a strain gauge in a force-torque sensor according to an exemplary embodiment of the present invention.
Figure 4:
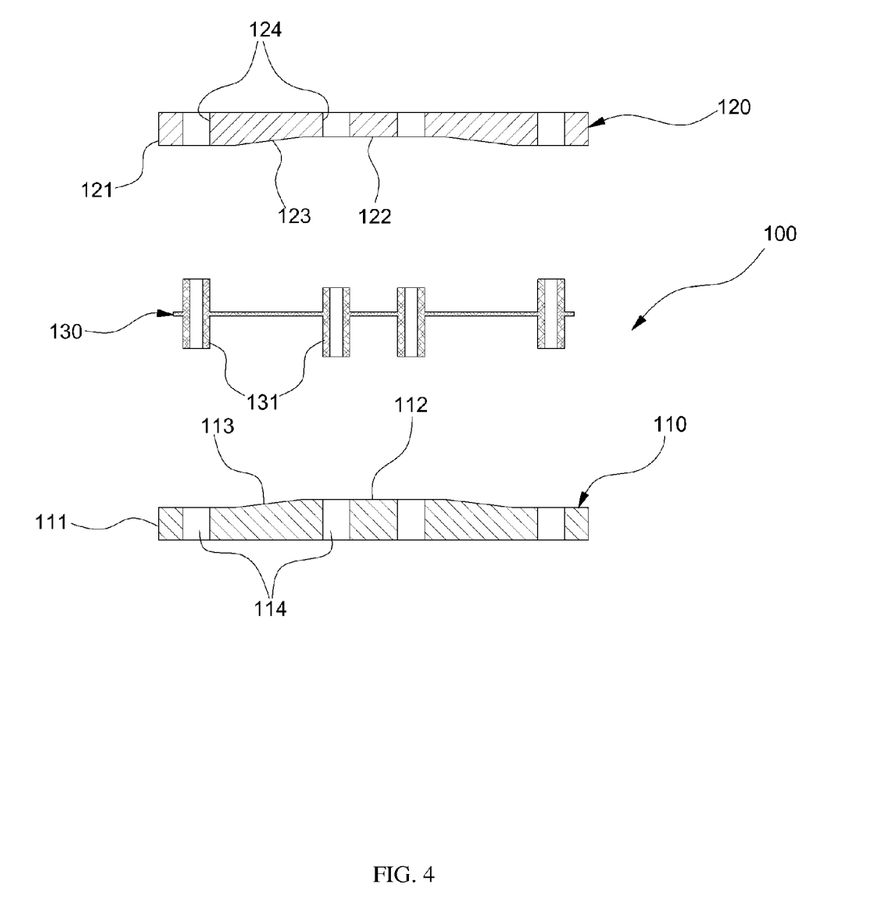
FIG. 4 is a cross-sectional view illustrating a gauge film before assembled with first and second sensor structure in a force-torque sensor according to an exemplary embodiment of the present invention.

FIG. 3 is a plan view of a gauge film including a strain gauge in a force-torque sensor according to an exemplary embodiment of the present invention. FIG. 4 is a cross-sectional view illustrating a gauge film before assembled with first and second sensor structure in a force-torque sensor according to an exemplary embodiment of the present invention.

Figure 5:
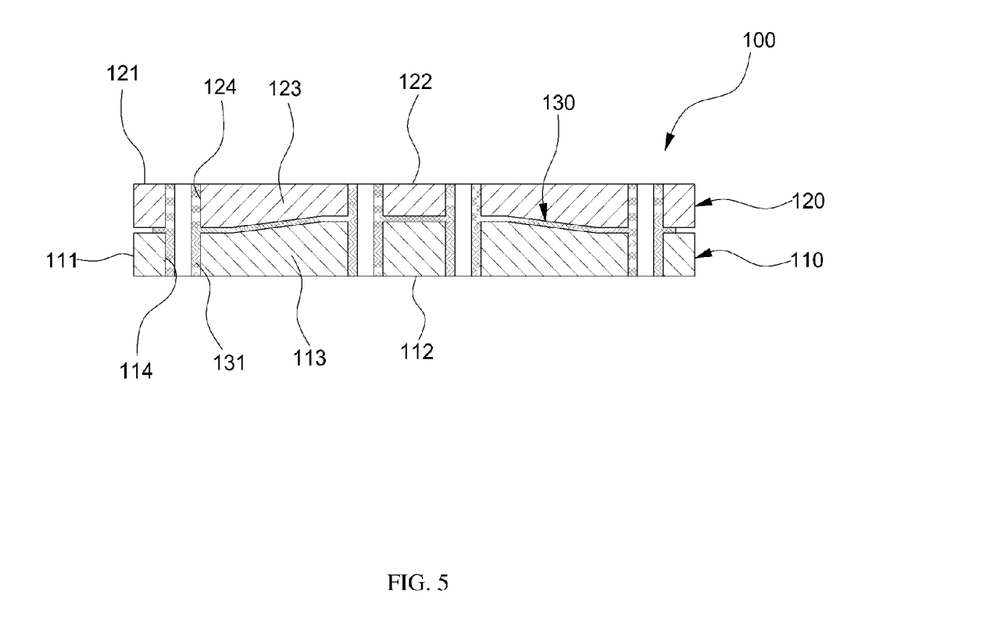
FIG. 5 is a cross-sectional view illustrating an assembly of a force-torque sensor according to an exemplary embodiment of the present invention.

FIG. 5 is a cross-sectional view illustrating an assembly of a force-torque sensor according to an exemplary embodiment of the present invention, which shows a gauge film 130 deformed between a first sensor structure 110 of a convex type and a second sensor structure 120 of a concave type after assembling.

A force-torque sensor 100 may include a single gauge film 130 that is deformed at an initial stage. The force-torque sensor 100 may include a first sensor structure 110, a second sensor structure 120, and a gauge film 130. The first sensor structure 110 may have a convex part at the bonding surface thereof. The second sensor structure 120 may have a concave part at the bonding surface thereof, which is bonded to the convex part of the first sensor structure 110. The gauge film 130 may be compressively interposed/sandwiched between the bonding surfaces of the first and second sensor structures 110 and 120 to be initially deformed.

A process for manufacturing the force-torque sensor 110 may include forming a first sensor structure 110 having a convex part at the bonding surface thereof and a second sensor structure 120 having a concave part bonded to the convex part of the first sensor structure 110, forming a gauge film 130 by installing a strain gauge 132 on a flexible film, compressively interposing the gauge film 130 between the bonding surface of the first sensor structure 110 having the convex part and the bonding surface of the second sensor structure 120 having the concave part to initially deform the gauge film, and fixing the first sensor structure 110 and the second sensor structure 120 to each other when the gauge film 130 is initially deformed.

The first sensor structure 110 and the second sensor structure 120 may be bonded to each other while the gauge film 130 is compressively interposed therebetween. The first and second sensor structures 110 and 120 may include outer coupling parts 111 and 121, central coupling parts 112 and 122, and plurality of connection parts 113 and 123, respectively. The outer coupling parts 111 and 121 may be disposed along the outer circumference or edge of the sensor 100. The central coupling parts 112 and 122 may be disposed at the central portion of the sensor 100 while spaced from the outer coupling parts 111 and 121 at a predetermined/specific distance, respectively. The plurality of connection parts 113 and 123 may integrally connect between the outer coupling parts 111 and 121 and the central coupling parts 112 and 122, respectively.

In one embodiment, the outer coupling parts 111 and 121 and the central coupling parts 112 and 122 may have a ring-shape, respectively. In the above structure in which the outer coupling parts 111 and 121 and the central coupling parts 112 and 122 are spaced from each other at the outer side and inner side, respectively, the plurality of connection parts 113 and 123 may connect between the outer connection parts 111 and 121 and the central coupling parts 112 and 122 in the radial direction.

In the first sensor structure 110 and the second sensor structure 120, the outer coupling parts 111 and 121 and the central coupling parts 112 and 122 may have different thicknesses and thus are disposed at different distances from the bonding surface between the first and second sensor structure 110 and 120, providing a thickness difference between the outer coupling parts 111 and 121 and the central coupling parts 112 and 122, respectively.

The first sensor structure 110 may have a central convex structure in which the thickness of the central coupling part 112 is greater than that of the outer coupling part 111 based on the bonding surface between the first sensor structure 110 and the second sensor structure 120. Accordingly, the central coupling part 112 may embody a convex part of the first sensor structure 110.

Conversely, the second sensor structure 120 may have a central concave structure in which the thickness of the central coupling part 122 is less than that of the outer coupling part 121 based on the bonding surface between the first sensor structure 110 and the second sensor structure 120. Accordingly, the central coupling part 122 may embody a concave part of the second sensor structure 120.

Since the connection parts 113 and 123 of the first and second sensor structures 110 and 120 may connect between the outer coupling parts 111 and 121 and the central coupling parts 112 and 122 that have a stepped difference therebetween, the bonding surface between the connection parts 113 and 123 may be formed at an incline.

Thus, the thickness difference may formed between the outer coupling parts 111 and 121 and the central coupling parts 112 and 122 of the first and second sensor structures 110 and 120 to cause the gauge film 130 to be initially deformed when the gauge film 130 is compressed between the first and second sensor structures 110 and 120.

As shown in FIG. 5, when the first and second sensor structures 110 and 120 are coupled with each other, the gauge film 130 may be deformed to have a central portion thereof protruding in one direction when the gauge film 130 is compressed between the outer coupling parts 111 and 121 and the central coupling parts 112 and 122 of the first and second sensor structures 110 and 120. Thus, when the gauge film 130 is interposed and compressed between the first and second sensor structures 110 and 120, the gauge film 130 may be deformed to have a convex structure at the central portion thereof. The force-torque sensor 100 may be completed by fixing the sensor structures 110 and 120 while the gauge film 130 is initially deformed.

In some exemplary embodiments of the present invention, the first and second sensor structures 110 and 120 may be formed of stainless steel or titanium through wire Electrical Discharge Machining (EDM). Furthermore, a plurality of coupling apertures 114 and 124 may be formed in the outer coupling parts 111 and 121 and the central coupling parts 112 and 122 of the first and second sensor structures 110 and 120, respectively. After the force-torque sensor 100 fixed together into a singular integrated part, the force-torque sensor 100 may be coupled to a distal mechanism and an arm of a robot via bolts through the coupling apertures 114 and 124.

The outer coupling parts 111 and 121 and the central coupling parts 112 and 122 may be coupled to the robot arm and the distal mechanism (tool) by bolts through the coupling holes 114 and 124, respectively, or the outer coupling parts 111 and 121 and the central coupling parts 112 and 122 may be coupled to the distal mechanism and the robot arm via bolts through the coupling holes 114 and 124, respectively.

As shown in FIG. 3, a plurality of strain gauges 132 may be disposed on the gauge film 130 in various axial directions, i.e., multi-axial directions. The strain gauges 132 may be disposed on a flexible and flat film formed of, for example, polyamide.

The gauge film 130 may have protrusions 131 that are inserted into the coupling apertures 114 and 124 of the outer coupling parts 111 and 121 and the central coupling parts 112 and 122 of the first and second sensor structures 110 and 120. When the gauge film 130 is initially manufactured, the height of the protrusions 131 inserted into the coupling apertures 114 and 124 of the outer coupling parts 111 and 121 may be different from the height of the protrusions 131 inserted into the coupling apertures 114 and 124 of the central coupling parts 112 and 122. The difference of the height of the protrusions 131 may be the same as the stepped difference between the outer coupling parts 111 and 121 and the central coupling parts 112 and 122 of the sensor structures 110 and 120.

In FIGS. 1 through 5, the protrusions 131 located at the central portion of the gauge film 130 may be inserted into the central coupling parts 112 and 122 of the sensor structures 110 and 120, and the protrusions 131 located at the outer portion of the gauge film 130 may be inserted into the outer coupling parts 111 and 121 of the sensor structures 110 and 120. Thus, when the force-torque sensor 110 is fabricated in a state where the gauge film 130 is interposed between the sensor structures 110 and 120, the gauge film 130 is initially deformed by the stepped difference between the outer coupling parts 111 and 121 and the central coupling parts 112 and 122 (initial deformation is induced from the state of FIG. 4 to the state of FIG. 5).

In the force-torque sensor 100, intended initial deformation may occur in the flexible gauge film 130 with the strain gauge 132 in various axial directions when interposed between the sensor structures 110 and 120. The force-torque sensor 100 inserted with the initially-deformed gauge film 130 can be manufactured. The first sensor structure 110 and the second sensor structure 120 between which the gauge film 130 is interposed may be bonded to each other by fusion bonding or welding.

Since the force-torque sensor 100 is manufactured by intentionally inducing initial deformation of a gauge film, the force-torque sensor 100 can measure both tension and compression deformations according to elasticity variation of a sensor structure. Also, multi-axial (e.g., three axial) forces and multi-axial (e.g., three axial) torques generated between the outer coupling part and the central coupling part can be measured by a conversion signal processing method using resistance variations of a plurality of strain gauges installed on a gauge film.

According to a strain gauge type force-torque sensor according to the above described embodiment of the present invention, since a gauge film is initially deformed between two sensor structures, a gauge film and a coupling part separately provided to measure compressing and tension can be unified, enabling both measurements of tension and compression.

Thus, a simple configuration which utilizes a single gauge film, multi-axial force and torque can be measured, and manufacturing cost can be saved in comparison to a typical sensor. Also, difficulties in attaching of a gauge and sensor defects and errors generated while attaching the gauge can be overcome by utilizing the above described exemplary embodiment of the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a strain gauge type force-torque sensor, comprising:
   forming a first sensor structure having a convex part on a bonding surface thereof and a second sensor structure having a concave part bonded to the convex part of the first sensor structure;
   forming a gauge film by installing a strain gauge on a flexible film;
   compressively interposing the gauge film between the bonding surface of the first sensor structure having the convex part and a bonding surface of the second sensor structure having the concave part to initially deform the gauge film; and
   fixing the first sensor structure and the second sensor structure to each when the gauge film is initially deformed.

2. The method of claim 1, wherein the first sensor structure and the second sensor structure comprises:
   an outer coupling part disposed around the circumference thereof;
   a central coupling part disposed inside the outer coupling part and spaced from the outer coupling part at a specific distance; and
   a plurality of connection parts connecting between the outer coupling part and the central coupling part that are spaced a predetermined distance from each other,
   wherein the outer coupling part, the central coupling part, and the plurality of connection parts are integrally formed, and the outer coupling part and the central coupling part are formed to have a different thickness so that the central coupling parts of each sensor structure embody the convex part and the concave part, respectively.

3. The method of claim 2, wherein the gauge film has protrusions on both surfaces thereof, and the protrusions are inserted into the outer coupling part and the central coupling part, respectively to fix the second sensor structure to the first sensor structure.

4. The method of claim 3, wherein the gauge film has strain gauges installed on a flexible and flat film in a multi-axial directions.

5. The method of claim 3, wherein the first sensor structure and the second sensor structure have a plurality of coupling apertures for coupling with external devices in the outer coupling part and the central coupling part thereof, respectively, and the protrusions of the gauge film are inserted into the coupling apertures of the outer coupling part and the central coupling part, respectively.

6. The method of claim 5, wherein the protrusions of the gauge film inserted into the coupling apertures of the outer coupling part have a different height from the protrusions of the gauge film inserted into the coupling apertures of the central coupling part, and a height difference between the protrusions is the same as a height difference between the central coupling part and the outer coupling part of each sensor structure.

7. A strain gauge type force-torque sensor manufactured by a method of claim 1, comprising:
   a first sensor structure having a convex part on a bonding surface thereof;
   a second sensor structure having a concave part on a bonding surface thereof; and
   a gauge film having a strain gauge disposed on a flexible film and compressively interposed between the bonding surface of the first sensor structure and the bonding surface of the second sensor structure to be initially deformed by the convex part of the first sensor structure and the concave part of the second sensor structure.

8. A strain gauge type force-torque sensor, comprising:
a first sensor structure having a convex part on a bonding surface thereof;
a second sensor structure having a concave part on a bonding surface thereof; and
a gauge film having a strain gauge disposed on a flexible film and compressively interposed between the bonding surface of the first sensor structure and the bonding surface of the second sensor structure to be initially deformed by the convex part of the first sensor structure and the concave part of the second sensor structure.

9. The strain gauge type force-torque sensor of claim 7, wherein the first sensor structure and the second sensor structure comprises:
an outer coupling part disposed around the circumference thereof;
a central coupling part disposed inside the outer coupling part and spaced from the outer coupling part at a specific distance; and
a plurality of connection parts connecting between the outer coupling part and the central coupling part that are spaced a predetermined distance from each other,
wherein the outer coupling part, the central coupling part, and the plurality of connection parts are integrally formed, and the outer coupling part and the central coupling part are formed to have a different thickness so that the central coupling parts of each sensor structure embody the convex part and the concave part, respectively.

10. The strain gauge type force-torque sensor of claim 9, wherein the gauge film has protrusions on both surfaces thereof, and the protrusions are inserted into the outer coupling part and the central coupling part, respectively to fix the second sensor structure to the first sensor structure.

11. The strain gauge type force-torque sensor of claim 10, wherein the gauge film has strain gauges installed on a flexible and flat film in a multi-axial directions.

12. The strain gauge type force-torque sensor of claim 10, wherein the first sensor structure and the second sensor structure have a plurality of coupling apertures for coupling with external devices in the outer coupling part and the central coupling part thereof, respectively, and the protrusions of the gauge film are inserted into the coupling apertures of the outer coupling part and the central coupling part, respectively.

13. The strain gauge type force-torque sensor of claim 12, wherein the protrusions of the gauge film inserted into the coupling apertures of the outer coupling part have a different height from the protrusions of the gauge film inserted into the coupling apertures of the central coupling part, and a height difference between the protrusions is the same as a height difference between the central coupling part and the outer coupling part of each sensor structure.

* * * * *